US008853319B2

(12) United States Patent
Weber et al.

(10) Patent No.: US 8,853,319 B2
(45) Date of Patent: Oct. 7, 2014

(54) REINFORCED STYRENE COPOLYMERS

(75) Inventors: Martin Weber, Maikammer (DE); Marko Blinzler, Mannheim (DE); Roelef Van Der Meer, Halsteren (NL)

(73) Assignee: Styrolution GmbH (DE)

( * ) Notice: Subject to any disclaimer, the term of this patent is extended or adjusted under 35 U.S.C. 154(b) by 0 days.

(21) Appl. No.: 13/319,754

(22) PCT Filed: May 6, 2010

(86) PCT No.: PCT/EP2010/056163
§ 371 (c)(1),
(2), (4) Date: Nov. 10, 2011

(87) PCT Pub. No.: WO2010/130621
PCT Pub. Date: Nov. 18, 2010

(65) Prior Publication Data
US 2012/0059109 A1    Mar. 8, 2012

(30) Foreign Application Priority Data

May 11, 2009   (EP) ..................... 09159897

(51) Int. Cl.
*C08G 18/08* (2006.01)
*C08L 25/12* (2006.01)
*C08L 25/14* (2006.01)
*C08L 69/00* (2006.01)
*C08L 101/00* (2006.01)

(52) U.S. Cl.
CPC ................. *C08L 25/12* (2013.01); *C08L 25/14* (2013.01); *C08L 69/00* (2013.01); *C08L 101/005* (2013.01)
USPC ........... 524/507; 524/504; 524/521; 523/351; 252/506; 252/511

(58) Field of Classification Search
CPC ......... C08L 25/08; C08L 25/12; C08L 33/20; C08K 3/40; C08K 7/02
USPC ............... 524/504, 507, 521; 525/70, 85, 66; 523/351; 252/506, 511
See application file for complete search history.

(56) References Cited

U.S. PATENT DOCUMENTS

| 3,651,014 | A | 3/1972 | Witsiepe |
| 4,023,977 | A * | 5/1977 | Mercurio et al. ............... 523/448 |
| 5,136,014 | A * | 8/1992 | Figuly ........................... 528/272 |
| 6,608,139 | B1 * | 8/2003 | Guntherberg et al. ........... 525/70 |
| 7,863,377 | B2 * | 1/2011 | Weber et al. ..................... 525/63 |
| 2003/0032761 | A1 | 2/2003 | Hofmann et al. |
| 2005/0054812 | A1 | 3/2005 | Wagner et al. |
| 2006/0094813 | A1 | 5/2006 | Warth et al. |
| 2007/0191532 | A1 | 8/2007 | De Kock et al. |
| 2008/0167430 | A1 * | 7/2008 | Bruchmann et al. .......... 525/452 |
| 2010/0036043 | A1 * | 2/2010 | Weber et al. ................... 524/504 |
| 2010/0197859 | A1 | 8/2010 | Weber et al. |
| 2011/0178205 | A1 * | 7/2011 | Weber et al. ................... 523/348 |
| 2011/0201747 | A1 | 8/2011 | Weber et al. |
| 2011/0306701 | A1 * | 12/2011 | Weber et al. ................... 523/351 |
| 2011/0319550 | A1 * | 12/2011 | Weber et al. ................... 524/514 |

FOREIGN PATENT DOCUMENTS

| DE | 4407485 A1 | 9/1995 |
| DE | 10024935 A1 | 11/2001 |
| DE | 101 38 216 A1 | 2/2003 |
| DE | 101 47 712 A1 | 4/2003 |
| DE | 10163163 A1 | 7/2003 |
| EP | 0784080 A1 | 7/1997 |
| WO | WO-91/06605 A1 | 5/1991 |
| WO | WO-2005/040281 A1 | 5/2005 |
| WO | WO-2006/040087 A1 | 4/2006 |
| WO | WO-2008/110539 A1 | 9/2008 |
| WO | WO-2008/119678 A1 | 10/2008 |

OTHER PUBLICATIONS

"ANSI: Standards Store." 2012, Retrieved online <http://www.webstore.ansi.org/recordDetail.aspx?sku-=DIN+63240-2:2007>.*
International Search report for PCT/EP2010/056163 mailed Jul. 7, 2010.

* cited by examiner

*Primary Examiner* — Hannah Pak
(74) *Attorney, Agent, or Firm* — Drinker Biddle & Reath LLP

(57) ABSTRACT

The thermoplastic molding composition comprises:
a) as component A, from 0 to 97.9% by weight of one or more (methyl)styrene-acrylonitrile copolymers which do not have any units derived from maleic anhydride, and which have an intrinsic viscosity smaller than 85 ml/g,
b) as component B, from 1 to 98.9% by weight of one or more (methyl)styrene-acrylonitrile copolymers which have, based on the entire component B, from 0.5 to 5% by weight of units derived from maleic anhydride,
c) as component C, from 1 to 75% by weight of glass fibers,
d) from 0.1 to 20% by weight of one or more flow promoters, selected from
  $d_1$) as component D1, at least one highly branched or hyperbranched polycarbonate with an OH number of from 1 to 600 mg KOH/g of polycarbonate (to DIN 53240, part 2),
  $d_2$) as component D2, at least one highly branched or hyperbranched polyester of $A_xB_y$ type, where x is at least 1.1 and y is at least 2.1,
  $d_3$) as component D3, alkyl acrylate oligomers with a weight-average molar mass in the range from 1200 to 4000 g/mol,
e) as component E, from 0 to 40% by weight of further fillers, or rubbers, and/or further additives,
where the total amount of components A to D and, if present, E is 100% by weight.

8 Claims, No Drawings

REINFORCED STYRENE COPOLYMERS

CROSS-REFERENCE TO RELATED APPLICATIONS

This application is a national stage application (under 35 U.S.C. §371) of PCT/EP2010/056163, filed May 6, 2010, which claims benefit of European application 09159897.9, filed May 11, 2009.

BACKGROUND OF THE INVENTION

The invention relates to glassfiber-reinforced styrene-acrylonitrile copolymers which comprise a flow promoter, to processes for their production, and to their use, and also to moldings, fibers, and foils produced therefrom.

Fiber-reinforced thermoplastics have numerous applications in the automobile sector. The quantitatively most important thermoplastic matrix system currently used is polypropylene. However, these products are not suitable for structural components subjected to high thermal and mechanical loads, because polypropylene has poor thermomechanical properties.

The use of glassfiber-reinforced styrene copolymers has also been proposed, alongside polypropylene. WO 2008/110539 describes a fiber-composite material which comprises glass fibers, alongside styrene-acrylonitrile copolymers and styrene-acrylonitrile-maleic anhydride copolymers. The molding compositions exhibit improved shear strength at elevated temperatures, in particular improved transverse-longitudinal shear strength.

However, for some applications the properties of the moldings are unsatisfactory. Matrix viscosity is an important controllable variable in the production of fiber-reinforced plastics. The melt viscosities of matrices of this type are generally too high for the production of fiber-composite materials.

BRIEF SUMMARY OF THE INVENTION

It is an object of the present invention to provide improved reinforced styrene copolymers with good mechanical properties, which have advantageous properties in molded parts, for the production of fiber-composite materials or of moldings. The advantages are intended to be obtainable not only when using chopped-strand glass reinforcement but also when using long-fiber or continuous-filament-fiber reinforcement.

The invention achieves the object via a thermoplastic molding composition, comprising, a) as component A, from 0 to 97.9% by weight of one or more (methyl)styrene-acrylonitrile copolymers which do not have any units derived from maleic anhydride, and which have an intrinsic viscosity smaller than 85 ml/g, b) as component B, from 1 to 98.9% by weight of one or more (methyl)styrene-acrylonitrile copolymers which have, based on the entire component B, from 0.5 to 5% by weight of units derived from maleic anhydride, c) as component C, from 1 to 75% by weight of glass fibers, d) from 0.1 to 20% by weight of one or more flow promoters, selected from $d_1$) as component D1, at least one highly branched or hyperbranched polycarbonate with an OH number of from 1 to 600 mg KOH/g of polycarbonate (to DIN 53240, part 2), $d_2$) as component D2, at least one highly branched or hyperbranched polyester of $A_xB_y$ type, where x is at least 1.1 and y is at least 2.1, $d_3$) as component D3, alkyl acrylate oligomers with a weight-average molar mass in the range from 1200 to 4000 g/mol, e) as component E, from 0 to 40% by weight of further fillers, or rubbers, and/or further additives, where the total amount of components A to D and, if present, E is 100% by weight.

The object is also achieved via a process for the production of these thermoplastic molding compositions, where components A to D and, if present, E are mixed in any desired sequence with one another.

A DETAILED DESCRIPTION OF THE INVENTION

The proportion of component A in the thermoplastic molding compositions is from 0 to 97.9% by weight or, if it is present, from 1 to 97.9% by weight, preferably from 35 to 95% by weight, in particular from 70 to 90% by weight.

The amount of component B comprised in the thermoplastic molding compositions is from 1 to 98.9% by weight, or if component A is present, from 1 to 97.9% by weight, preferably from 2 to 50% by weight, in particular from 3 to 10% by weight.

The amount of component C comprised in the thermoplastic molding compositions is from 1 to 75% by weight, preferably from 5 to 40% by weight, in particular from 10 to 20% by weight.

The amount of component D comprised in the thermoplastic molding compositions is from 0.1 to 20% by weight, preferably from 0.75 to 10% by weight, in particular from to 3% by weight.

The amount of component E comprised in the thermoplastic molding compositions is from 0 to 40% by weight, preferably from 0 to 30% by weight, in particular from 0 to 17% by weight. If component E is present, the minimum amount is 1% by weight.

Insofar as one or more ingredients of component E are present, the maximum possible amount of components A to D is correspondingly reduced by the minimum amount of component E that is to be added, thus in every case giving a total amount of 100% by weight.

Component A

The thermoplastic molding compositions of the invention comprise, as component A, one or more (methyl)styrene-acrylonitrile copolymers which have no units derived from maleic anhydride. Any desired comonomers can be present alongside styrene and acrylonitrile in the copolymers here. It is preferable that the material is a styrene-acrylonitrile copolymer or methylstyrene-acrylonitrile copolymer.

In principle, any of the following materials which are known to the person skilled in the art and are described in the literature can be used as component A of the thermoplastic matrix M: styrene-acrylonitrile copolymers, α-methylstyrene-acrylonitrile copolymers, or a mixture of these, as long as they have an intrinsic viscosity IV equal to or smaller than 85 ml/g (measured to DIN 53727 at 25° C., using a 0.5% strength by weight solution in dimethylformamide; this test method also applies to all of the intrinsic viscosities IV mentioned hereinafter).

Preferred components A are composed of from 50 to 90% by weight, preferably from 60 to 80% by weight, in particular from 65 to 78% by weight, of styrene, and from 10 to 50% by weight, preferably from 20 to 40% by weight, in particular from 22 to 35% by weight, of acrylonitrile, and also from 0 to 5% by weight, preferably from 0 to 4% by weight, in particular from 0 to 3% by weight, of further monomers, where each of the % by weight values is based on the weight of component A and these give a total of 100% by weight.

Preference is further given to components A composed of from 50 to 90% by weight, preferably from 60 to 80% by weight, in particular from 65 to 78% by weight, of α-methylstyrene, and from 10 to 50% by weight, preferably from 20 to 40% by weight, in particular from 22 to 35% by weight, of acrylonitrile, and also from 0 to 5% by weight, preferably from 0 to 4% by weight, in particular from 0 to 3% by weight, of further monomers, where each of the % by weight values is based on the weight of component A and these give a total of 100% by weight.

Components A which are likewise preferred are mixtures of said styrene-acrylonitrile copolymers and of said α-methylstyrene-acrylonitrile copolymers.

Abovementioned further monomers that can be used are any of the copolymerizable monomers that differ from maleic anhydride, examples being p-methylstyrene, tert-butylstyrene, vinylnaphthalene, alkyl acrylates and/or alkyl methacrylates, for example those having $C_1$-$C_8$-alkyl radicals, N-phenylmaleimide or a mixture of these.

The copolymers of component A can be produced by methods known per se. By way of example, they can be produced via free-radical polymerization, in particular via emulsion, suspension, solution, or bulk polymerization.

The styrene copolymers are preferably rubber-free.

Component B

The thermoplastic molding compositions of the invention comprise, as component B, (methyl)styrene-acrylonitrile copolymers which have, based on the entire component B, from 0.5 to 5% by weight of units derived from maleic anhydride. This proportion is preferably from 1 to 3% by weight, in particular from 2.0 to 2.2% by weight.

It is particularly preferable that component B is a styrene-acrylonitrile-maleic anhydride terpolymer.

The proportion of acrylonitrile in the terpolymer, based on the entire terpolymer, is preferably from 10 to 30% by weight, particularly preferably from 15 to 30% by weight, in particular from 20 to 25% by weight. The remainder is made up by styrene.

The copolymers generally have molar masses $M_w$ in the range from 30 000 to 500 000 g/mol, preferably from 50 000 to 250 000 g/mol, in particular from 70 000 to 200 000 g/mol, determined via GPC using tetrahydrofuran (THF) as eluent, and using polystyrene calibration.

The copolymers can be produced via free-radical-generating polymerization of the corresponding monomers. The production process is explained in more detail by way of example in WO 2005/040281, page 10, line 31 to page 11, line 8.

It is also possible to use styrene-N-phenylmaleimide-maleic anhydride terpolymers. Reference can also be made to the descriptions in EP-A-0 784 080 and DE-A-100 24 935, and also to DE-A-44 07 485, the description of component B in that document on pages 6 and 7.

Component C

The thermoplastic molding compositions of the invention comprise, as component C, glass fibers. Glass fibers that can be used are any of the types of glass industrially available. By way of example, materials that can be used are chopped-strand glass, long glass fibers, or continuous-filament glass fibers. Suitable glass fibers are described in Handbook of Reinforcements for Plastics, Van Nostrand Reinholt Company Inc., 1987, pages 233 ff. Glass fibers that can be used are the rovings familiar in industry, the fiber diameter of the individual filaments preferably being from 6 to 30 μm. During fiber production, the individual filaments are usually combined to give strands, the weight of which per kilometer is stated in the usual fiber-technology manner, in tex. Preference is given to use of glass fiber rovings of from 1000 to 10 000 tex.

To improve compatibility with the matrix material, the glass fibers can have been equipped with size and with a coupling agent. The diameter of preferred glass fibers is in the range from 6 to 20 μm. The average length of the glass fibers in the finished injection molding is preferably in the range from 0.08 to 5 mm.

When moldings are produced by pressing, there is no restriction on fiber length.

The glass fibers can also be used in the form of wovens, mats, or glass-silk rovings.

Component D

One or more flow improvers is/are used as component D, selected from $d_1$) as component D1, at least one highly branched or hyperbranched polycarbonate with an OH number of from 1 to 600 mg KOH/g of polycarbonate (to DIN 53240, part 2), $d_2$) as component D2, at least one highly branched or hyperbranched polyester of $A_xB_y$ type, where x is at least 1.1 and y is at least 2.1, $d_3$) as component D3, alkyl acrylate oligomers with a weight-average molar mass in the range from 1200 to 4000 g/mol.

It is preferable that component D1 has a number-average molar mass $M_n$ of from 100 to 15 000 g/mol, and that component D2 has a number-average molar mass $M_n$ of from 300 to 30 000 g/mol.

It is preferable that component D1 has a glass transition temperature $T_g$ of from −80° C. to 140° C., and that component D2 has a glass transition temperature $T_g$ of from −50° C. to 140° C.

It is preferable that component D1 has a viscosity (mPas) of from 50 to 200 000 at 23° C. (to DIN 53019).

It is preferable that component D2 has an OH number (to DIN 53240) of from 0 to 600 mg KOH/g of polyester, and/or a COOH number (to DIN 53240) of from 0 to 600 mg KOH/g of polyester.

It is preferable that component D3 is a poly-n-butyl acrylate oligomer with a weight-average molar mass of from 1500 to 2000 g/mol (determined via GPC).

The molding compositions of the invention comprise, as component D), from 0.1 to 20% by weight of D1) at least one highly branched or hyperbranched polycarbonate with an OH number of from 1 to 600 mg KOH/g of polycarbonate, preferably from 10 to 550 mg KOH/g of polycarbonate, and in particular from 50 to 550 mg KOH/g of polycarbonate (to DIN 53240, part 2), or of at least one hyperbranched polyester, as component D2), or of a mixture of these, as explained below.

For the purposes of this invention, hyperbranched polycarbonates D1) are non-crosslinked macromolecules having hydroxy groups and carbonate groups, these having both structural and molecular non-uniformity. Their structure may firstly be based on a central molecule in the same way as dendrimers, but with non-uniform chain length of the branches. Secondly, they may also have a linear structure with functional pendant groups, or else they may combine the two extremes, having linear and branched molecular portions. See also P. J. Flory, J. Am. Chem. Soc. 1952, 74, 2718, and H. Frey et al., Chem. Eur. J. 2000, 6, no. 14, 2499 for the definition of dendrimeric and hyperbranched polymers.

"Hyperbranched" in the context of the present invention means that the degree of branching (DB), i.e. the total of the average number of dendritic linkages and terminal units divided by the total of the average number of all linkages (dendritic, linear, and terminal linkages) multiplied by 100, is from 10 to 99.9%, preferably from 20 to 99%, and particularly preferably from 20 to 95%.

"Dendrimeric" in the context of the present invention means that the degree of branching is from 99.9 to 100%. See H. Frey et al., Acta Polym. 1997, 48, 30 for the definition of "degree of branching".

It is preferable that component D1) has a number-average molar mass Mn of from 100 to 15 000 g/mol, preferably from 200 to 12 000 g/mol, and in particular from 500 to 10 000 g/mol (GPC, PMMA standard).

The glass transition temperature Tg is in particular from −80° C. to +140, preferably from −60 to 120° C. (from DSC, DIN 53765).

Viscosity (mPas) is in particular from 50 to 200 000, in particular from 100 to 150 000, and very particularly preferably from 200 to 100 000 (to DIN 53019) at 23° C.

Component D1) is preferably obtainable via a process which comprises at least the following steps:

a) reaction of at least one organic carbonate (A) of the general formula RO[(CO)]nOR with at least one aliphatic, aliphatic/aromatic, or aromatic alcohol (B) which has at least 3OH groups, with elimination of alcohols ROH to give one or more condensates (K), where each R, independently of the others, is a straight-chain or branched aliphatic, aromatic/aliphatic or aromatic hydrocarbon radical having from 1 to 20 carbon atoms, and where the radicals R may also have bonding to one another to form a ring, and n is a whole number from 1 to 5, or ab) reaction of phosgene, diphosgene, or triphosgene with abovementioned alcohol (B), with elimination of hydrogen chloride and b) intermolecular reaction of the condensates (K) to give a highly functional, highly branched, or highly functional, hyperbranched polycarbonate, where the quantitative proportion of the OH groups to the carbonates in the reaction mixture is selected in such a way that the condensates (K) have an average of either one carbonate group and more than one OH group or one OH group and more than one carbonate group.

Phosgene, diphosgene, or triphosgene may be used as starting material, but preference is given to organic carbonates.

Each of the radicals R of the organic carbonates (A) used as starting material and having the general formula RO(CO)nOR is, independently of the others, a straight-chain or branched aliphatic, aromatic/aliphatic or aromatic hydrocarbon radical having from 1 to 20 carbon atoms. The two radicals R may also have bonding to one another to form a ring. The radical is preferably an aliphatic hydrocarbon radical, and particularly preferably a straight-chain or branched alkyl radical having from 1 to 5 carbon atoms, or a substituted or unsubstituted phenyl radical.

In particular, use is made of simple carbonates of the formula RO(CO)nOR; n is preferably from 1 to 3, in particular 1.

By way of example, dialkyl or diaryl carbonates may be produced from the reaction of aliphatic, araliphatic, or aromatic alcohols, preferably monoalcohols, with phosgene. They may also be produced by way of oxidative carbonylation of the alcohols or phenols by means of CO in the presence of noble metals, oxygen, or NOx. In relation to preparation methods for diaryl or dialkyl carbonates, see also "Ullmann's Encyclopedia of Industrial Chemistry", 6th edition, 2000 Electronic Release, Verlag Wiley-VCH.

Examples of suitable carbonates comprise aliphatic, aromatic/aliphatic or aromatic carbonates, such as ethylene carbonate, propylene 1,2- or 1,3-carbonate, diphenyl carbonate, ditolyl carbonate, dixylyl carbonate, dinaphthyl carbonate, ethyl phenyl carbonate, dibenzyl carbonate, dimethyl carbonate, diethyl carbonate, dipropyl carbonate, dibutyl carbonate, diisobutyl carbonate, dipentyl carbonate, dihexyl carbonate, dicyclohexyl carbonate, diheptyl carbonate, dioctyl carbonate, didecyl carbonate, or didodecyl carbonate.

Examples of carbonates where n is greater than 1 comprise dialkyl dicarbonates, such as di(tert-butyl)dicarbonate, or dialkyl tricarbonates, such as di(tert-butyl)tricarbonate.

It is preferable to use aliphatic carbonates, in particular those in which the radicals comprise from 1 to 5 carbon atoms, e.g. dimethyl carbonate, diethyl carbonate, dipropyl carbonate, dibutyl carbonate, or diisobutyl carbonate.

The organic carbonates are reacted with at least one aliphatic alcohol (B) which has at least 3OH groups, or with mixtures of two or more different alcohols.

Examples of compounds having at least three OH groups comprise glycerol, trimethylolmethane, trimethylolethane, trimethylolpropane, 1,2,4-butanetriol, tris(hydroxymethyl)amine, tris(hydroxyethyl)amine, tris(hydroxypropyl)amine, pentaerythritol, diglycerol, triglycerol, polyglycerols, bis(trimethylolpropane), tris(hydroxymethyl)isocyanurate, tris(hydroxyethyl)isocyanurate, phloroglucinol, trihydroxytoluene, trihydroxydimethylbenzene, phloroglucides, hexahydroxybenzene, 1,3,5-benzenetrimethanol, 1,1,1-tris(4'-hydroxyphenyl)methane, 1,1,1-tris(4'-hydroxyphenyl)ethane, or sugars, e.g. glucose, trihydric or higher polyhydric polyetherols based on trihydric or higher polyhydric alcohols and ethylene oxide, propylene oxide, or butylene oxide, or polyesterols. Particular preference is given here to glycerol, trimethylolethane, trimethylolpropane, 1,2,4-butanetriol, pentaerythritol, and also their polyetherols based on ethylene oxide or propylene oxide.

These polyhydric alcohols may also be used in a mixture with dihydric alcohols (B'), with the proviso that the average total OH functionality of all of the alcohols used is greater than 2. Examples of suitable compounds having two OH groups comprise ethylene glycol, diethylene glycol, triethylene glycol, 1,2- and 1,3-propanediol, dipropylene glycol, tripropylene glycol, neopentyl glycol, 1,2-, 1,3-, and 1,4-butanediol, 1,2-, 1,3-, and 1,5-pentanediol, hexanediol, cyclopentanediol, cyclohexanediol, cyclohexanedimethanol, bis(4-hydroxycyclohexyl)methane, bis(4-hydroxycyclohexyl)-ethane, 2,2-bis(4-hydroxycyclohexyl)propane, 1,1'-bis(4-hydroxyphenyl)-3,3,5-tri-methylcyclohexane, resorcinol, hydroquinone, 4,4'-dihydroxyphenyl, bis(4-bis(hydroxy-phenyl)sulfide, bis(4-hydroxyphenyl)sulfone, bis(hydroxymethyl)benzene, bis-(hydroxymethyl)toluene, bis(p-hydroxyphenyl)methane, bis(p-hydroxyphenyl)ethane, 2,2-bis(p-hydroxyphenyl)propane, 1,1'-bis(p-hydroxyphenyl)cyclohexane, dihydroxy-benzophenone, dihydric polyether polyols based on ethylene oxide, propylene oxide, butylene oxide, or mixtures of these, polytetrahydrofuran, polycaprolactone, or polyesterols based on diols and dicarboxylic acids.

The diols serve for fine adjustment of the properties of the polycarbonate. If use is made of dihydric alcohols, the ratio of dihydric alcohols B') to the at least trihydric alcohols (B) is set by the person skilled in the art and depends on the desired properties of the polycarbonate. The amount of the alcohol(s) (B') is generally from 0 to 39.9 mol %, based on the total amount of all of the alcohols (B) and (B') taken together. The amount is preferably from 0 to 35 mol %, particularly preferably from 0 to 25 mol %, and very particularly preferably from 0 to 10 mol %.

The reaction of phosgene, diphosgene, or triphosgene with the alcohol or alcohol mixture generally takes place with elimination of hydrogen chloride, and the reaction of the carbonates with the alcohol or alcohol mixture to give the inventive highly functional highly branched polycarbonate takes place with elimination of the monofunctional alcohol or phenol from the carbonate molecule.

The highly functional highly branched polycarbonates formed by the inventive process have termination by hydroxy groups and/or by carbonate groups after the reaction, i.e. with no further modification. They have good solubility in various solvents, e.g. in water, alcohols, such as methanol, ethanol, butanol, alcohol/water mixtures, acetone, 2-butanone, ethyl acetate, butyl acetate, methoxypropyl acetate, methoxyethyl acetate, tetrahydrofuran, dimethylformamide, dimethylacetamide, N-methylpyrrolidone, ethylene carbonate, or propylene carbonate.

For the purposes of this invention, a highly functional polycarbonate is a product which, besides the carbonate groups which form the polymer skeleton, further has at least three, preferably at least six, more preferably at least ten, terminal or pendant functional groups. The functional groups are carbonate groups and/or OH groups. There is in principle no upper restriction on the number of the terminal or pendant functional groups, but products having a very high number of functional groups can have undesired properties, such, as high viscosity or poor solubility. The highly functional polycarbonates of the present invention mostly have not more than 500 terminal or pendant functional groups, preferably not more than 100 terminal or pendant functional groups.

When preparing the highly functional polycarbonates D1), it is necessary to adjust the ratio of the compounds comprising OH groups to phosgene or carbonate in such a way that the simplest resultant condensate (hereinafter termed condensate (K)) comprises an average of either one carbonate group or carbamoyl group and more than one OH group or one OH group and more than one carbonate group or carbamoyl group. The simplest structure of the condensate (K) composed of a carbonate (A) and a di- or polyalcohol (B) here results in the arrangement XYn or YnX, where X is a carbonate group, Y is a hydroxy group, and n is generally a number from 1 to 6, preferably from 1 to 4, particularly preferably from 1 to 3. The reactive group which is the single resultant group here is generally termed "focal group" below.

By way of example, if during the preparation of the simplest condensate (K) from a carbonate and a dihydric alcohol the reaction ratio is 1:1, the average result is a molecule of XY type, illustrated by the general formula 1.

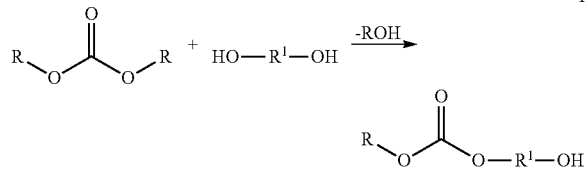

During the preparation of the condensate (K) from a carbonate and a trihydric alcohol with a reaction ratio of 1:1, the average result is a molecule of XY2 type, illustrated by the general formula 2. A carbonate group is focal group here.

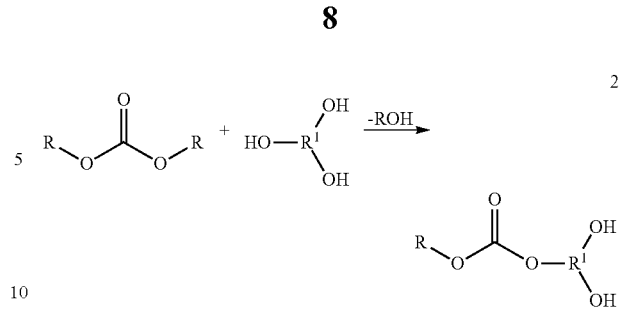

During the preparation of the condensate (K) from a carbonate and a tetrahydric alcohol, likewise with the reaction ratio 1:1, the average result is a molecule of XY3 type, illustrated by the general formula 3. A carbonate group is focal group here.

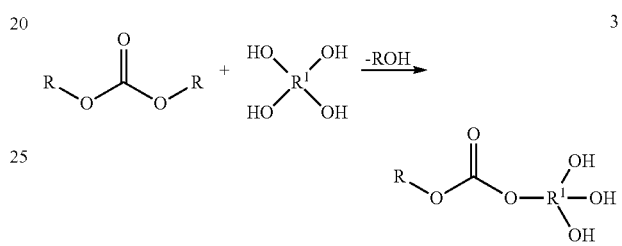

R in the formulae 1 to 3 has the definition given at the outset, and R1 is an aliphatic or aromatic radical.

The condensate (K) may, by way of example, also be produced from a carbonate and a trihydric alcohol, as illustrated by the general formula 4, the molar reaction ratio being 2:1. Here, the average result is a molecule of X2Y type, an OH group being focal group here. In formula 4, R and R1 are as defined in formulae 1 to 3.

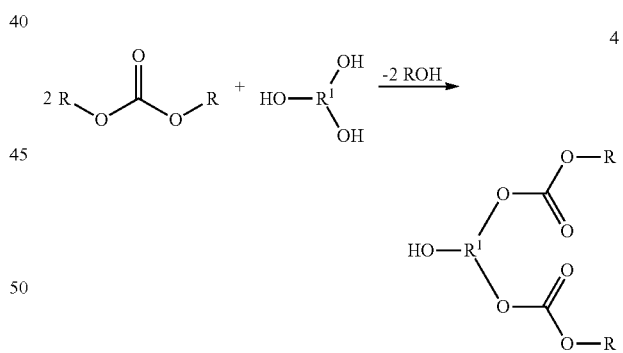

If difunctional compounds, e.g. a dicarbonate or a diol, are also added to the components, this extends the chains, as illustrated by way of example in the general formula 5. The average result is again a molecule of XY2 type, a carbonate group being focal group.

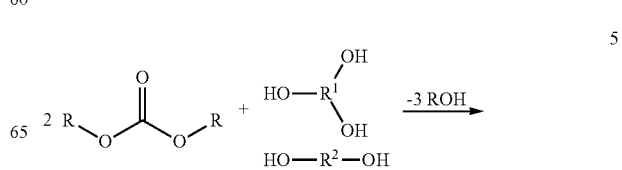

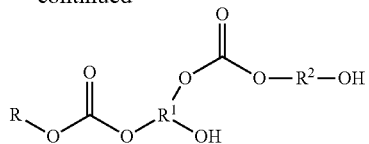

In formula 5, R2 is an organic, preferably aliphatic radical, and R and R1 are as defined above.

It is also possible to use two or more condensates (K) for the synthesis. Here, firstly two or more alcohols or two or more carbonates may be used. Furthermore, mixtures of various condensates of different structure can be obtained via the selection of the ratio of the alcohols used and of the carbonates or the phosgenes. This may be illustrated taking the example of the reaction of a carbonate with a trihydric alcohol. If the starting products are used in a ratio of 1:1, as shown in (II), the result is an XY2 molecule. If the starting products are used in a ratio of 2:1, as shown in (IV), the result is an X2Y molecule. If the ratio is from 1:1 to 2:1, the result is a mixture of XY2 and X2Y molecules.

According to the invention, the simple condensates (K) described by way of example in the formulae 1-5 preferentially react intermolecularly to form highly functional polycondensates, hereinafter termed polycondensates (P). The reaction to give the condensate (K) and to give the polycondensate (P) usually takes place at a temperature of from 0 to 250° C., preferably from 60 to 160° C., in bulk or in solution. Use may generally be made here of any of the solvents which are inert with respect to the respective starting materials. Preference is given to use of organic solvents, e.g. decane, dodecane, benzene, toluene, chlorobenzene, xylene, dimethylformamide, dimethylacetamide, or solvent naphtha.

In one preferred embodiment, the condensation reaction is carried out in bulk. To accelerate the reaction, the phenol or the monohydric alcohol ROH liberated during the reaction can be removed by distillation from the reaction equilibrium if appropriate at reduced pressure.

If removal by distillation is intended, it is generally advisable to use those carbonates which liberate alcohols ROH with a boiling point below 140° C. during the reaction.

Catalysts or catalyst mixtures may also be added to accelerate the reaction. Suitable catalysts are compounds which catalyze esterification or transesterification reactions, e.g. alkali metal hydroxides, alkali metal carbonates, alkali metal hydrogencarbonates, preferably of sodium, of potassium, or of cesium, tertiary amines, guanidines, ammonium compounds, phosphonium compounds, organoaluminum, organotin, organozinc, organotitanium, organozirconium, or organobismuth compounds, or else what are known as double metal cyanide (DMC) catalysts, e.g. as described in DE 10138216 or DE 10147712.

It is preferable to use potassium hydroxide, potassium carbonate, potassium hydrogencarbonate, diazabicyclooctane (DABCO), diazabicyclononene (DBN), diazabicycloundecene (DSU), imidazoles, such as imidazole, 1-methylimidazole, or 1,2-dimethylimidazole, titanium tetrabutoxide, titanium tetraisopropoxide, dibutyltin oxide, dibutyltin dilaurate, stannous dioctoate, zirconium acetylacetonate, or mixtures thereof.

The amount of catalyst generally added is from 50 to 10 000 ppm by weight, preferably from 100 to 5000 ppm by weight, based on the amount of the alcohol mixture or alcohol used.

It is also possible to control the intermolecular polycondensation reaction via addition of the suitable catalyst or else via selection of a suitable temperature. The average molecular weight of the polymer (P) may moreover be adjusted by way of the composition of the starting components and by way of the residence time.

The condensates (K) and the polycondensates (P) produced at an elevated temperature are usually stable at room temperature for a relatively long period.

The nature of the condensates (K) permits polycondensates (P) with different structures to result from the condensation reaction, these having branching but no crosslinking. Furthermore, in the ideal case, the polycondensates (P) have either one carbonate group as focal group and more than two OH groups or else one OH group as focal group and more than two carbonate groups. The number of the reactive groups here is the result of the nature of the condensates (K) used and the degree of polycondensation.

By way of example, a condensate (K) according to the general formula 2 can react via triple intermolecular condensation to give two different polycondensates (P), represented in the general formulae 6 and 7.

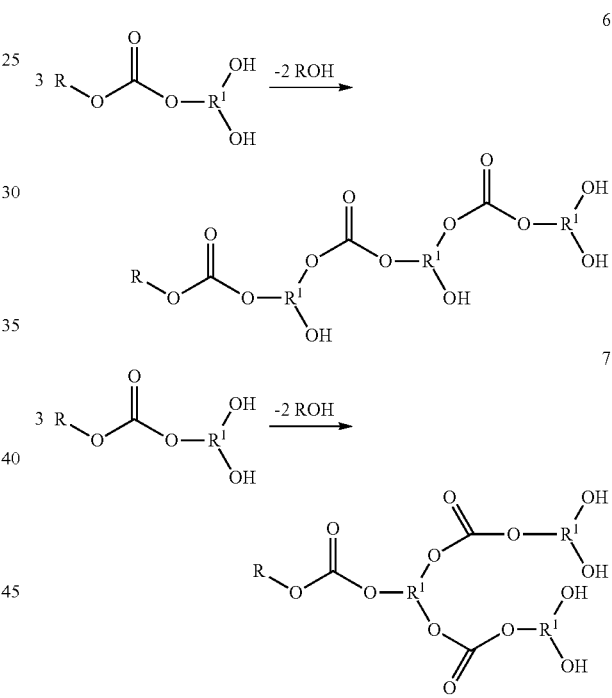

In formula 6 and 7, R and R1 are as defined above.

There are various ways of terminating the intermolecular polycondensation reaction. By way of example, the temperature may be lowered to a range where the reaction stops and the product (K) or the polycondensate (P) is storage-stable.

It is also possible to deactivate the catalyst, for example in the case of basic catalysts via addition of Lewis acids or protic acids.

In another embodiment, as soon as the intermolecular reaction of the condensate (K) has produced a polycondensate (P) with the desired degree of polycondensation, a product having groups reactive toward the focal group of (P) may be added to the product (P) to terminate the reaction. In the case of a carbonate group as focal group, by way of example, a mono-, di-, or polyamine may be added. In the case of a hydroxy group as focal group, by way of example, a mono-, di-, or polyisocyanate, or a compound comprising epoxy groups, or an acid derivative which reacts with OH groups, can be added to the product (P).

The inventive highly functional polycarbonates are mostly produced in the pressure range from 0.1 mbar to 20 bar, preferably at from 1 mbar to 5 bar, in reactors or reactor cascades which are operated batchwise, semicontinuously, or continuously.

The inventive products can be further processed without further purification after their preparation by virtue of the abovementioned adjustment of the reaction conditions and, if appropriate, by virtue of the selection of the suitable solvent.

In another preferred embodiment, the product is stripped, i.e. freed from low-molecular-weight, volatile compounds. For this, once the desired degree of conversion has been reached the catalyst may optionally be deactivated and the low-molecular-weight volatile constituents, e.g. monoalcohols, phenols, carbonates, hydrogen chloride, or volatile oligomeric or cyclic compounds, can be removed by distillation, if appropriate with introduction of a gas, preferably nitrogen, carbon dioxide, or air, if appropriate at reduced pressure.

In another preferred embodiment, the inventive polycarbonates may comprise other functional groups besides the functional groups present at this stage by virtue of the reaction. The functionalization may take place during the process to increase molecular weight, or else subsequently, i.e. after completion of the actual polycondensation.

If, prior to or during the process to increase molecular weight, components are added which have other functional groups or functional elements besides hydroxy or carbonate groups, the result is a polycarbonate polymer with randomly distributed functionalities other than the carbonate or hydroxy groups.

Effects of this type can, by way of example, be achieved via addition, during the polycondensation, of compounds which bear other functional groups or functional elements, such as mercapto groups, primary, secondary or tertiary amino groups, ether groups, derivatives of carboxylic acids, derivatives of sulfonic acids, derivatives of phosphonic acids, silane groups, siloxane groups, aryl radicals, or long-chain alkyl radicals, besides hydroxy groups, carbonate groups or carbamoyl groups. Examples of compounds which may be used for modification by means of carbamate groups are ethanolamine, propanolamine, isopropanolamine, 2-(butylamino)ethanol, 2-(cyclohexyl-amino)ethanol, 2-amino-1-butanol, 2-(2'-aminoethoxy)ethanol or higher alkoxylation products of ammonia, 4-hydroxypiperidine, 1-hydroxyethylpiperazine, diethanolamine, dipropanolamine, diisopropanolamine, tris(hydroxymethyl)aminomethane, tris(hydroxy-ethyl)aminomethane, ethylenediamine, propylenediamine, hexamethylenediamine or isophoronediamine.

An example of a compound which can be used for modification with mercapto groups is mercaptoethanol. By way of example, tertiary amino groups can be produced via incorporation of N-methyldiethanolamine, N-methyldipropanolamine or N,N-dimethyl-ethanolamine. By way of example, ether groups may be generated via co-condensation of dihydric or higher polyhydric polyetherols. Long-chain alkyl radicals can be introduced via reaction with long-chain alkanediols, and reaction with alkyl or aryl diisocyanates generates polycarbonates having alkyl, aryl, and urethane groups, or having urea groups.

Ester groups can be produced via addition of dicarboxylic acids, tricarboxylic acids, for example dimethyl terephthalate, or tricarboxylic esters.

Subsequent functionalization can be achieved by using an additional step of the process (step c)) to react the resultant highly functional highly branched, or highly functional hyperbranched polycarbonate with a suitable functionalizing reagent which can react with the OH and/or carbonate groups or carbamoyl groups of the polycarbonate.

By way of example, highly functional highly branched, or highly functional hyperbranched polycarbonates comprising hydroxy groups can be modified via addition of molecules comprising acid groups or isocyanate groups. By way of example, polycarbonates comprising acid groups can be obtained via reaction with compounds comprising anhydride groups.

Highly functional polycarbonates comprising hydroxy groups may moreover also be converted into highly functional polycarbonate polyether polyols via reaction with alkylene oxides, e.g. ethylene oxide, propylene oxide, or butylene oxide.

A great advantage of the process is its cost-effectiveness. Both the reaction to give a condensate (K) or polycondensate (P) and also the reaction of (K) or (P) to give polycarbonates with other functional groups or elements can take place in one reactor, this being advantageous technically and in terms of cost-effectiveness.

The inventive molding compositions may comprise, as component D2), at least one hyperbranched polyester of AxBy type, where
x is at least 1.1, preferably at least 1.3, in particular at least 2
y is at least 2.1, preferably at least 2.5, in particular at least 3.

Use may also be made of mixtures as units A and/or B, of course.

An AxBy-type polyester is a condensate composed of an x-functional molecule A and a y-functional molecule B. By way of example, mention may be made of a polyester composed of adipic acid as molecule A (x=2) and glycerol as molecule B (y=3).

For the purposes of this invention, hyperbranched polyesters D2) are non-crosslinked macromolecules having hydroxy groups and carboxy groups, these having both structural and molecular non-uniformity. Their structure may firstly be based on a central molecule in the same way as dendrimers, but with non-uniform chain length of the branches. Secondly, they may also have a linear structure with functional pendant groups, or else they may combine the two extremes, having linear and branched molecular portions. See also P. J. Flory, J. Am. Chem. Soc. 1952, 74, 2718, and H. Frey et al., Chem. Eur. J. 2000, 6, no. 14, 2499 for the definition of dendrimeric and hyperbranched polymers.

"Hyperbranched" in the context of the present invention means that the degree of branching (DB), i.e. the total of the average number of dendritic linkages and terminal units, divided by the average total number of linkages (dendritic, linear, and terminal linkages) multiplied by 100 is from 10 to 99.9%, preferably from 20 to 99%, and particularly preferably from 20 to 95%.

"Dendrimeric" in the context of the present invention means that the degree of branching is from 99.9 to 100%. See H. Frey et al., Acta Polym. 1997, 48, 30, for the definition of "degree of branching".

Component D2) preferably has an Mn of from 300 to 30 000 g/mol, in particular from 400 to 25 000 g/mol, and very particularly from 500 to 20 000 g/mol, determined by means of GPC, PMMA standard, dimethylacetamide eluent.

D2) preferably has an OH number of from 0 to 600 mg KOH/g of polyester, preferably from 1 to 500 mg KOH/g of polyester, in particular from 20 to 500 mg KOH/g of polyester to DIN 53240, and preferably a COOH number of from 0 to 600 mg KOH/g of polyester, preferably from 1 to 500 mg KOH/g of polyester, and in particular from 2 to 500 mg KOH/g of polyester.

The Tg is preferably from −50° C. to 140° C., and in particular from −50 to 100° C. (by means of DSC, to DIN 53765).

Preference is particularly given to those components D2) in which at least one OH or COOH number is greater than 0, preferably greater than 0.1, and in particular greater than 0.5.

The inventive component D2) is in particular obtainable via the processes described below, specifically by reacting
(a) one or more dicarboxylic acids or one or more derivatives of the same with one or more at least trihydric alcohols Or (b) one or more tricarboxylic acids or higher polycarboxylic acids or one or more derivatives of the same with one or more diols in the presence of a solvent and optionally in the presence of an inorganic, organometallic, or low-molecular-weight organic catalyst, or of an enzyme. The reaction in solvent is the preferred preparation method.

For the purposes of the present invention, highly functional hyperbranched polyesters D2) have molecular and structural non-uniformity. Their molecular non-uniformity distinguishes them from dendrimers, and they can therefore be produced at considerably lower cost.

Among the dicarboxylic acids which can be reacted according to variant (a) are, by way of example, oxalic acid, malonic acid; succinic acid, glutaric acid, adipic acid, pimelic acid, suberic acid, azelaic acid, sebacic acid, undecane-α,ω-dicarboxylic acid, dodecane-α,ω-dicarboxylic acid, cis- and trans-cyclohexane-1,2-dicarboxylic acid, cis- and trans-cyclohexane-1,3-dicarboxylic acid, cis- and trans-cyclohexane-1,4-di-carboxylic acid, cis- and trans-cyclopentane-1,2-dicarboxylic acid, and cis- and trans-cyclopentane-1,3-dicarboxylic acid,
where the abovementioned dicarboxylic acids may have substitution by one or more radicals selected from
C1-C10-alkyl groups, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, 2-ethylhexyl, n-nonyl, and n-decyl,
C3-C12-cycloalkyl groups, such as cyclopropyl, cyclobutyl, cyclopentyl, cyclohexyl, cycloheptyl, cyclooctyl, cyclononyl, cyclodecyl, cycloundecyl, and cyclododecyl; preference is given to cyclopentyl, cyclohexyl, and cycloheptyl;
alkylene groups, such as methylene or ethylidene, or
C6-C14-aryl groups, such as phenyl, 1-naphthyl, 2-naphthyl, 1-anthryl, 2-anthryl, 9-anthryl, 1-phenanthryl, 2-phenanthryl, 3-phenanthryl, 4-phenanthryl, and 9-phenanthryl, preferably phenyl, 1-naphthyl, and 2-naphthyl, particularly preferably phenyl.

Examples which may be mentioned as representatives of substituted dicarboxylic acids are: 2-methylmalonic acid, 2-ethylmalonic acid, 2-phenylmalonic acid, 2-methylsuccinic acid, 2-ethylsuccinic acid, 2-phenylsuccinic acid, itaconic acid, 3,3-dimethylglutaric acid.

Among the dicarboxylic acids which can be reacted according to variant (a) are also ethylenically unsaturated acids, such as maleic acid and fumaric acid, and aromatic dicarboxylic acids, such as phthalic acid, isophthalic acid or terephthalic acid.

It is also possible to use mixtures of two or more of the abovementioned representative compounds.

The dicarboxylic acids may either be used as they stand or be used in the form of derivatives.

Derivatives are preferably
the relevant anhydrides in monomeric or else polymeric form,
mono- or dialkyl esters, preferably mono- or dimethyl esters, or the corresponding mono- or diethyl esters, or else the mono- and dialkyl esters derived from higher alcohols, such as n-propanol, isopropanol, n-butanol, isobutanol, tert-butanol, n-pentanol, n-hexanol,
and also mono- and divinyl esters, and
mixed esters, preferably methyl ethyl esters.

In the preferred preparation process it is also possible to use a mixture composed of a dicarboxylic acid and one or more of its derivatives. Equally, it is possible to use a mixture of two or more different derivatives of one or more dicarboxylic acids.

It is particularly preferable to use succinic acid, glutaric acid, adipic acid, phthalic acid, isophthalic acid, terephthalic acid, or the mono- or dimethyl esters thereof. It is very particularly preferable to use adipic acid.

Examples of at least trihydric alcohols which may be reacted are: glycerol, butane-1,2,4-triol, n-pentane-1,2,5-triol, n-pentane-1,3,5-triol, n-hexane-1,2,6-triol, n-hexane-1,2,5-triol, n-hexane-1,3,6-triol, trimethylolbutane, trimethylolpropane or ditrimethylol-propane, trimethylolethane, pentaerythritol or dipentaerythritol; sugar alcohols, such as mesoerythritol, threitol, sorbitol, mannitol, or mixtures of the above at least trihydric alcohols. It is preferable to use glycerol, trimethylolpropane, trimethylolethane, and pentaerythritol.

Examples of tricarboxylic acids or polycarboxylic acids which can be reacted according to variant (b) are benzene-1,2,4-tricarboxylic acid, benzene-1,3,5-tricarboxylic acid, benzene-1,2,4,5-tetracarboxylic acid, and mellitic acid.

Tricarboxylic acids or polycarboxylic acids may be used in the inventive reaction either as they stand or else in the form of derivatives.

Derivatives are preferably
the relevant anhydrides in monomeric or else polymeric form,
mono-, di-, or trialkyl esters, preferably mono-, di-, or trimethyl esters, or the corresponding mono-, di-, or triethyl esters, or else the mono-, di-, and triesters derived from higher alcohols, such as n-propanol, isopropanol, n-butanol, isobutanol, tert-butanol, n-pentanol, n-hexanol, or else mono-, di-, or trivinyl esters
and mixed methyl ethyl esters.

For the purposes of the present invention, it is also possible to use a mixture composed of a tri- or polycarboxylic acid and one or more of its derivatives. For the purposes of the present invention it is likewise possible to use a mixture of two or more different derivatives of one or more tri- or polycarboxylic acids, in order to obtain component D2).

Examples of diols used for variant (b) of the present invention are ethylene glycol, propane-1,2-diol, propane-1,3-diol, butane-1,2-diol, butane-1,3-diol, butane-1,4-diol, butane-2,3-diol, pentane-1,2-diol, pentane-1,3-diol, pentane-1,4-diol, pentane-1,5-diol, pentane-2,3-diol, pentane-2,4-diol, hexane-1,2-diol, hexane-1,3-diol, hexane-1,4-diol, hexane-1,5-diol, hexane-1,6-diol, hexane-2,5-diol, heptane-1,2-diol, 1,7-heptanediol, 1,8-octanediol, 1,2-octanediol, 1,9-nonanediol, 1,10-decanediol, 1,2-decanediol, 1,12-dodecanediol, 1,2-dodecanediol, 1,5-hexadiene-3,4-diol, cyclopentanediols, cyclohexanediols, inositol and derivatives, (2)-methylpentane-2,4-diol, 2,4-dimethyl-pentane-2,4-diol, 2-ethylhexane-1,3-diol, 2,5-dimethylhexane-2,5-diol, 2,2,4-trimethyl-pentane-1,3-diol, pinacol, diethylene glycol, triethylene glycol, dipropylene glycol, tripropylene glycol, polyethylene glycols HO(CH2CH2O)n-H or polypropylene glycols HO(CH[CH3]

CH2O)n-H or mixtures of two or more representative compounds of the above compounds, where n is a whole number and n=from 4 to 25. One, or else both, hydroxy groups here in the abovementioned diols may also be replaced by SH groups. Preference is given to ethylene glycol, propane-1,2-diol, and diethylene glycol, triethylene glycol, dipropylene glycol, and tripropylene glycol.

The molar ratio of the molecules A to molecules B in the AxBy polyester in the variants (a) and (b) is from 4:1 to 1:4, in particular from 2:1 to 1:2.

The at least trihydric alcohols reacted according to variant (a) of the process may have hydroxy groups of which all have identical reactivity. Preference is also given here to at least trihydric alcohols whose OH groups initially have identical reactivity, but where reaction with at least one acid group can induce a fall-off in reactivity of the remaining OH groups as a result of steric or electronic effects. By way of example, this applies when trimethylolpropane or pentaerythritol is used.

However, the at least trihydric alcohols reacted according to variant (a) may also have hydroxy groups having at least two different chemical reactivities.

The different reactivity of the functional groups here may derive either from chemical causes (e.g. primary/secondary/tertiary OH group) or from steric causes.

By way of example, the triol may comprise a triol which has primary and secondary hydroxy groups, a preferred example being glycerol.

When the inventive reaction is carried out according to variant (a), it is preferable to operate in the absence of diols and of monohydric alcohols.

When the inventive reaction is carried out according to variant (b), it is preferable to operate in the absence of mono- or dicarboxylic acids.

The process of the invention is carried out in the presence of a solvent. By way of example, hydrocarbons are suitable, such as paraffins or aromatics. Particularly suitable paraffins are n-heptane and cyclohexane. Particularly suitable aromatics are toluene, ortho-xylene, meta-xylene, para-xylene, xylene in the form of an isomer mixture, ethylbenzene, chlorobenzene, and ortho- and meta-dichlorobenzene. Other solvents very particularly suitable in the absence of acidic catalysts are: ethers, such as dioxane or tetrahydrofuran, and ketones, such as methyl ethyl ketone and methyl isobutyl ketone.

According to the invention, the amount of solvent added is at least 0.1% by weight, based on the weight of the starting materials used and to be reacted, preferably at least 1% by weight, and particularly preferably at least 10% by weight. It is also possible to use excesses of solvent, based on the weight of starting materials used and to be reacted, e.g. from 1.01 to 10 times the amount. Solvent amounts of more than 100 times the weight of the starting materials used and to be reacted are not advantageous, because the reaction rate decreases markedly at markedly lower concentrations of the reactants, giving uneconomically long reaction times.

To carry out the process preferred according to the invention, operations may be carried out in the presence of a dehydrating agent as additive, added at the start of the reaction. Suitable examples are molecular sieves, in particular 4 Å molecular sieve, MgSO4, and Na2SO4. During the reaction it is also possible to add further dehydrating agent or to replace dehydrating agent by fresh dehydrating agent. During the reaction it is also possible to remove the water or alcohol formed by distillation and, for example, to use a water trap.

The process may be carried out in the absence of acidic catalysts. It is preferable to operate in the presence of an acidic inorganic, organometallic, or organic catalyst, or a mixture composed of two or more acidic inorganic, organometallic, or organic catalysts.

For the purposes of the present invention, examples of acidic inorganic catalysts are sulfuric acid, phosphoric acid, phosphonic acid, hypophosphorous acid, aluminum sulfate hydrate, alum, acidic silica gel (pH=6, in particular =5), and acidic aluminum oxide. Examples of other compounds which can be used as acidic inorganic catalysts are aluminum compounds of the general formula Al(OR)$_3$ and titanates of the general formula Ti(OR)$_4$, where each of the radicals R may be identical or different and is selected independently of the others from C1-C10-alkyl radicals, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, 2-ethylhexyl, n-nonyl, and n-decyl, C3-C12-cycloalkyl radicals, such as cyclopropyl, cyclobutyl, cyclopentyl, cyclohexyl, cycloheptyl, cyclooctyl, cyclononyl, cyclodecyl, cycloundecyl, and cyclododecyl; preference is given to cyclopentyl, cyclohexyl, and cycloheptyl.

Each of the radicals R in Al(OR)3 or Ti(OR)4 is preferably identical and selected from isopropyl or 2-ethylhexyl.

Examples of preferred acidic organometallic catalysts are selected from dialkyltin oxides R$_2$SnO, where R is defined as above. A particularly preferred representative compound for acidic organometallic catalysts is di-n-butyltin oxide, which is commercially available as "oxo-tin", or di-n-butyltin dilaurate.

Preferred acidic organic catalysts are acidic organic compounds having, by way of example, phosphate groups, sulfonic acid groups, sulfate groups, or phosphonic acid groups. Particular preference is given to sulfonic acids, such as para-toluenesulfonic acid. Acidic ion exchangers may also be used as acidic organic catalysts, e.g. polystyrene resins comprising sulfonic acid groups and crosslinked with about 2 mol % of divinylbenzene.

It is also possible to use combinations of two or more of the abovementioned catalysts. It is also possible to use an immobilized form of those organic or organometallic, or else inorganic catalysts which take the form of discrete molecules.

If the intention is to use acidic inorganic, organometallic, or organic catalysts, according to the invention the amount used is from 0.1 to 10% by weight, preferably from 0.2 to 2% by weight, of catalyst.

The inventive process is carried out under inert gas, e.g. under carbon dioxide, nitrogen, or a noble gas, among which mention may particularly be made of argon.

The inventive process is carried out at temperatures of from 60 to 200° C. It is preferable to operate at temperatures of from 130 to 180° C., in particular up to 150° C., or below that temperature. Maximum temperatures up to 145° C. are particularly preferred, and temperatures up to 135° C. are very particularly preferred.

The pressure conditions for the inventive process are not critical per se. It is possible to operate at markedly reduced pressure, e.g. at from 10 to 500 mbar. The inventive process may also be carried out at pressures above 500 mbar. A reaction at atmospheric pressure is preferred for reasons of simplicity; however, conduct at slightly increased pressure is also possible, e.g. up to 1200 mbar. It is also possible to operate at markedly increased pressure, e.g. at pressures up to 10 bar. Reaction at atmospheric pressure is preferred.

The reaction time for the inventive process is usually from 10 minutes to 25 hours, preferably from 30 minutes to 10 hours, and particularly preferably from one to 8 hours.

Once the reaction has ended, the highly functional hyperbranched polyesters can easily be isolated, e.g. by removing the catalyst by filtration and concentrating the mixture, the concentration process here usually being carried out at reduced pressure. Other work-up methods with good suitability are precipitation after addition of water, followed by washing and drying.

Component D2) can also be produced in the presence of enzymes or decomposition products of enzymes (according to DE-A 101 63163). For the purposes of the present invention, the term acidic organic catalysts does not include the dicarboxylic acids reacted according to the invention.

It is preferable to use lipases or esterases. Lipases and esterases with good suitability are *Candida cylindracea, Candida lipolytica, Candida rugosa, Candida antarctica, Candida utilis, Chromobacterium viscosum, Geotrichum viscosum, Geotrichum candidum, Mucor javanicus, Mucor mihei*, pig pancreas, *pseudomonas* spp., *pseudomonas fluorescens, Pseudomonas cepacia, Rhizopus arrhizus, Rhizopus delemar, Rhizopus niveus, Rhizopus oryzae, Aspergillus niger, Penicillium roquefortii, Penicillium camembertii*, or esterase from *Bacillus* spp. and *Bacillus thermoglucosidasius. Candida antarctica* lipase B is particularly preferred. The enzymes listed are commercially available, for example from Novozymes Biotech Inc., Denmark.

The enzyme is preferably used in immobilized form, for example on silica gel or Lewatit@. The processes for immobilizing enzymes are known per se, e.g. from Kurt Faber, "Biotransformations in organic chemistry", 3rd edition 1997, Springer Verlag, Chapter 3.2 "Immobilization" pp. 345-356. Immobilized enzymes are commercially available, for example from Novozymes Biotech Inc., Denmark.

The amount of immobilized enzyme used is from 0.1 to 20% by weight, in particular from 10 to 15% by weight, based on the total weight of the starting materials used and to be reacted.

The inventive process is carried out at temperatures above 60° C. It is preferable to operate at temperatures of 100° C. or below that temperature. Preference is given to temperatures up to 80° C., very particular preference is given to temperatures of from 62 to 75° C., and still more preference is given to temperatures of 65 to 75° C.

The inventive process is carried out in the presence of a solvent. Examples of suitable compounds are hydrocarbons, such as paraffins or aromatics. Particularly suitable paraffins are n-heptane and cyclohexane. Particularly suitable aromatics are toluene, ortho-xylene, meta-xylene, para-xylene, xylene in the form of an isomer mixture, ethylbenzene, chlorobenzene and ortho- and meta-dichlorobenzene. Other very particularly suitable solvents are: ethers, such as dioxane or tetrahydrofuran, and ketones, such as methyl ethyl ketone and methyl isobutyl ketone.

The amount of solvent added is at least 5 parts by weight, based on the weight of the starting materials used and to be reacted, preferably at least 50 parts by weight, and particularly preferably at least 100 parts by weight. Amounts of more than 10 000 parts by weight of solvent are undesirable, because the reaction rate decreases markedly at markedly lower concentrations, giving uneconomically long reaction times.

The inventive process is carried out at pressures above 500 mbar. Preference is given to the reaction at atmospheric pressure or slightly increased pressure, for example at up to 1200 mbar. It is also possible to operate under markedly increased pressure, for example at pressures up to 10 bar. Reaction at atmospheric pressure is preferred.

The reaction time for the inventive process is usually from 4 hours to 6 days, preferably from 5 hours to 5 days, and particularly preferably from 8 hours to 4 days.

Once the reaction has ended, the highly functional hyperbranched polyesters can be isolated, e.g. by removing the enzyme by filtration and concentrating the mixture, this concentration process usually being carried out at reduced pressure. Other work-up methods with good suitability are precipitation after addition of water, followed by washing and drying.

The highly functional, hyperbranched polyesters obtainable by the inventive process feature particularly low contents of discolored and resinified material. For the definition of hyperbranched polymers, see also: P. J. Flory, J. Am. Chem. Soc. 1952, 74, 2718, and A. Sunder et al., Chem. Eur. J. 2000, 6, no. 1, 1-8. However, in the context of the present invention, "highly functional hyperbranched" means that the degree of branching, i.e. the average number of dendritic linkages plus the average number of end groups per molecule, is from 10 to 99.9%, preferably from 20 to 99%, particularly preferably from 30 to 90% (see in this connection H. Frey et al. Acta Polym. 1997, 48, 30).

The polyesters of the invention have a molar mass $M_w$ of from 500 to 50 000 g/mol, preferably from 1000 to 20 000 g/mol, particularly preferably from 1000 to 19 000 g/mol. The polydispersity is from 1.2 to 50, preferably from 1.4 to 40, particularly preferably from 1.5 to 30, and very particularly preferably from 1.5 to 10. They are usually very soluble, i.e. clear solutions can be produced using up to 50% by weight, in some cases even up to 80% by weight, of the inventive polyesters in tetrahydrofuran (THF), n-butyl acetate, ethanol, and numerous other solvents, with no gel particles detectable by the naked eye.

The highly functional hyperbranched polyesters of the invention are carboxy-terminated, carboxy- and hydroxy-terminated, and preferably hydroxy-terminated.

The ratios of the components D1):D2) are preferably from 1:20 to 20:1, in particular from 1:15 to 15:1, and very particularly from 1:5 to 5:1 if a mixture of these is used.

The hyperbranched polycarbonates D1)/polyesters D2) used are particles of size of from 20 to 500 nm. These nanoparticles are in finely dispersed form in the polymer blend, and the size of the particles in the compounded material is from 20 to 500 nm, preferably from 50 to 300 nm.

As an alternative, it is possible to use, as component D3, alkyl acrylate oligomers with weight-average molar mass in the range from 1200 to 4000 g/mol, preferably from 1500 to 2000 g/mol. The molar mass is determined here by means of gel permeation chromatography. The alkyl acrylates are preferably $C_{1-12}$-alkyl acrylates, in particular $C_{4-8}$-alkyl acrylates. It is particularly preferable to use butyl acrylates or ethylhexyl acrylates, and specifically preferable to use n-butyl acrylate. The alkyl acrylate oligomers are produced by the known processes of polymerization. The polybutyl acrylates are preferably produced by free-radical polymerization, possible initiators used here being azo compounds or peroxide compounds. The production of such compounds is described by way of example in "Encyclopedia of Polymer Science and Engineering, H. F. Mark (Ed.) J, Wiley & Sons, New York, 1985, pages 265 ff., and production processes are also described from page 269 onward in the same document. The polybutyl acrylates can comprise up to 40% by weight, preferably up to 20% by weight, of one or more copolymerizable monomers. Preferred comonomers are those selected from the group consisting of acrylates, methacrylates, styrene or its derivatives, maleic anhydride, acrylonitrile, and mixtures thereof.

It is preferable to use polybutyl acrylates which are liquid at room temperature.

Component E

The thermoplastic molding compositions of the invention can comprise, as component E, additional fibrous or particulate fillers, examples being carbon fibers, potassium titanate whiskers, aramid fibers, etc.

Suitable particulate fillers are amorphous silica, magnesium carbonate (chalk), powdered quartz, mica, talc, feldspar, glass beads, and in particular calcium silicates, such as wollastonite, and kaolin (in particular calcined kaolin).

Particularly preferred combinations of fillers are those composed of glass fibers (component C) and wollastonite.

The thermoplastic molding compositions can moreover comprise, as component E, impact-modifying rubbers, in particular graft rubbers. For the purposes of the invention, graft rubbers are core-shell rubbers which can also have a multi-shell structure. Conventional impact modifiers can be used here.

Rubbers comprise an elastomeric fraction having a glass transition temperature below −10° C., preferably below −30° C., and they also comprise by way of example at least one functional group. Examples of suitable functional groups are carboxylic acid, carboxylic anhydride, carboxylic ester, carboxamide, carboximide, amino, hydroxy, epoxy, urethane, and oxazoline groups.

Examples of rubbers which increase the toughness of the blends are the following:

EP rubbers or EPDM rubbers, respectively grafted with the abovementioned functional groups. Examples of suitable graft reagents are maleic anhydride, itaconic acid, acrylic acid, glycidyl acrylate, and glycidyl methacrylate.

These monomers can be grafted in the melt or in solution onto the polymer, if appropriate in the presence of a free-radical generator, such as cumene hydroperoxide.

Mention may also be made of copolymers of α-olefins. The α-olefins are usually monomers having from 2 to 8 carbon atoms, preferably ethylene and propylene. Comonomers that have proven suitable are alkyl acrylates or alkyl methacrylates which derive from alcohols having from 1 to 8 carbon atoms, preferably from ethanol, butanol, or ethylhexanol, and also reactive comonomers, such as acrylic acid, methacrylic acid, maleic acid, maleic anhydride, or glycidyl (meth)acrylate, and also vinyl esters, in particular vinyl acetate. It is also possible to use a mixture of various comonomers. Materials which have proved particularly suitable are copolymers of ethylene with ethyl or butyl acrylate and acrylic acid and/or maleic anhydride.

The copolymers can be produced in a high-pressure process at a pressure of from 400 to 4500 bar or via grafting of the comonomers onto the poly-α-olefin. The proportion of the α-olefin, based on the copolymer, is generally in the range from 99.95 to 55% by weight.

A further group of suitable elastomers are core-shell graft rubbers. The core-shell graft rubbers are graft rubbers which are produced in emulsion and which are composed of at least one hard and one soft constituent. A hard constituent is usually a polymer whose glass transition temperature is at least 25° C., and a soft constituent is usually a polymer whose glass transition temperature is at most 0° C. These products have a structure composed of a core and of at least one shell, and the structure here is the result of the sequence of addition of the monomers. The soft constituents derive inter alia from butadiene, isoprene, alkyl acrylates, alkyl methacrylates or siloxanes, and, if appropriate, from further comonomers. Suitable siloxane cores can by way of example by produced from cyclic oligomeric octamethyltetrasiloxane or tetravinyl-tetramethyltetrasiloxane, or tetravinyltetramethyltetrasiloxane. These can by way of example be reacted with γ-mercaptopropylmethyldimethoxysilane in a ring-opening cationic polymerization reaction, preferably in the presence of sulfonic acids, to give the soft siloxane cores. The siloxanes can also be crosslinked, for example by carrying out the polymerization reaction in the presence of silanes having hydrolyzable groups, such as halogen or alkoxy groups, examples being tetraethoxysilane, methyltrimethoxysilane, or phenyltrimethoxysilane. Examples of suitable comonomers that may be mentioned here are styrene, acrylonitrile, and crosslinking or graft-active monomers having more than one polymerizable double bond, e.g. diallyl phthalate, divinylbenzene, butanediol diacrylate or triallyl (iso)cyanurate. The hard constituents derive inter alia from styrene, α-methylstyrene, and copolymers of these, and preferred comonomers that may be listed here are acrylonitrile, methacrylonitrile, and methyl methacrylate.

Preferred core-shell graft rubbers comprise a soft core and a hard shell, or a hard core, a first soft shell, and at least one further hard shell. It is possible here, though not essential, to incorporate functional groups, such as carbonyl groups, carboxylic acid groups, anhydride groups, carboxamide groups, carboximide groups, carboxylic ester groups, amino groups, hydroxy groups, epoxy groups, oxazoline groups, urethane groups, urea groups, lactam groups, or halobenzyl groups, and this is preferably achieved here via addition of suitably functionalized monomers during the polymerization of the final shell. Examples of suitable functionalized monomers are maleic acid, maleic anhydride, mono- or diesters of maleic acid, tert-butyl (meth)acrylate, acrylic acid, glycidyl (meth)acrylate, and vinyloxazoline. The proportion of monomers having functional groups is generally 0 or 0.1 to 25% by weight, preferably 0 or 0.25 to 15% by weight, based on the total weight of the core-shell graft rubber. The ratio by weight of soft to hard constituents is generally from 1:9 to 9:1, preferably from 3:7 to 8:2.

Rubbers of this type are known per se and are described by way of example in EP-A 208 187.

Another group of suitable impact modifiers is that of thermoplastic polyester elastomers. Polyester elastomers here are segmented copolyetheresters which comprise long-chain segments which generally derive from poly(alkylene)ether glycols and short-chain segments which derive from low-molecular-weight diols and dicarboxylic acids. Products of this type are known per se and are described in the literature, e.g. in US-A 3 651 014. Corresponding products are also commercially available as Hytrel® (Du Pont), Arnitel® (Akzo), and Peiprene® (Toyobo Co. Ltd.).

It is also possible, of course, to use a mixture of various rubbers.

It is preferable that the materials are graft rubbers which comprise no olefinic double bonds. They are particularly preferably ASA rubbers (acrylonitrile-styrene-alkyl acrylate rubbers).

Polymerization of the hard phase also produces subordinate amounts of ungrafted fractions. These are counted with the hard phase. It is also possible to use a mixture of various rubbers, and it is preferable here that the soft-phase fractions of the rubbers used differ by at least 5% by weight.

Further additives can be used as further components E. Examples of these are flame retardants, dyes, pigments, or stabilizers, such as heat stabilizers or UV stabilizers, and also lubricants or mold-release agents.

The invention also provides a process for the production of the thermoplastic molding compositions described above, where components A-D and, if appropriate, E are mixed with one another in any desired sequence.

By way of example, the fiber-composite materials of the invention can be produced via pultrusion. The glassfiber rovings here are wetted with thermoplastic melt, and the resultant semifinished product is then pressed to give moldings. The mixing of the matrix components can be carried out as described below, but can also take place during the melting of the matrix prior to the pultrusion process.

The sequence in which the components are mixed is as desired. By way of example, it is possible to produce the molding compositions by mixing the starting components in conventional mixing apparatuses, such as screw-based extruders, preferably twin-screw extruders, or in Brabender mixers or Banbury mixers, or else in kneaders, and then extruding the same. The extrudate is cooled and comminuted. The sequence of mixing components can be varied, and it is therefore possible to premix two or, if appropriate, three components. However, it is also possible to mix all of the components together.

Intensive mixing is advantageous in order to obtain maximum homogeneity of mixture. Average mixing times required for this are generally from 0.2 to 30 minutes at temperatures of from 240 to 300° C., preferably from 245 to 290° C. The extrudate is generally cooled and comminuted.

The molding compositions of the invention feature inter alia improved toughness and stiffness. They also feature high transverse-longitudinal shear strength at 80° C.

The thermoplastic molding compositions of the invention can be used for the production of moldings, fibers, and foils. In particular, they are used for the production of moldings, e.g. for motor-vehicle components, or in electronic equipment.

The invention also provides moldings, fibers, and foils, composed of the molding compositions of the invention.

The invention is further illustrated by the examples below.

EXAMPLES

Production and Testing of Molding Compositions

The intrinsic viscosity of the styrene co- or terpolymers is determined to DIN 53727 in 0.5% strength by weight DMF solution at 25° C.

The heat resistance of the specimens was determined by means of the Vicat softening point. The Vicat softening point was determined on standard small specimens to DIN 53 460, using a force of 49.05 N and a temperature rise of 50 K per hour.

The impact resistance of the products was determined on ISO specimens to ISO 179 1 eU.

The stiffness of the materials is characterized via the modulus of elasticity determined in the tensile test to ISO 527. This test is also used to determine tensile strain at break.

Semifinished products were first produced by pultrusion. Here, the melt is produced by a single-screw extruder and introduced into the impregnation unit. Glassfiber rovings are introduced simultaneously. The take-off speed was 2 m/min. The proportion of fiber by volume was adjusted to 0.5.

The specimens were manufactured by melting and pressing of the fiber-thermoplastic semifinished product in a specimen mold. The specimen mold was electrically heated, and the pressure was applied via a hydraulic press. The maximum pressure force was 120 kN. The dimensions of the specimens were 40 mm*380 mm, and the thickness of the specimens here was variable. The proportion of fiber by volume rose to about 0.52 during the pressing procedure.

Component A1
Copolymer composed of 75% by weight of styrene and 25% by weight of acrylonitrile, characterized by an intrinsic viscosity of 80 ml/g (measured at 25° C. in 0.5% strength by weight DMF solution).

Component A2
Copolymer composed of 76% by weight of styrene and 24% by weight of acrylonitrile, characterized by an intrinsic viscosity of 66 ml/g (measured at 25° C. in 0.5% strength by weight DMF solution).

Component A Comp
Copolymer composed of 76% by weight of styrene and 24% by weight of acrylonitrile, characterized by an intrinsic viscosity of 55 ml/g (measured at 25° C. in 0.5% strength by weight DMF solution).

Component B1
SANMA terpolymer (74/25/1% by weight) with IV of 80 ml/g.

Component B2
SANMA terpolymer (73/25/2% by weight) with IV of 80 ml/g.

Component C (Glass Fibers)
C1:
Glass fibers with an aminosilane size were used to produce the compounded materials, fiber diameter 10 μm, staple fibers of length 4.5 mm.

C2:
Glassfiber roving R099 2400 5383 from Vetrotex with an aminosilane size, fiber diameter 17 μm.

Component D1
Hyperbranched Polycarbonate:
General Operating Specification:

The polyhydric alcohol TMP×1.2 PO, diethyl carbonate, and 0.15% by weight of potassium carbonate as catalyst (amount based on amount of alcohol) were used as initial charge in a molar alcohol:carbonate ratio of 1:1 in a three-necked flask equipped with stirrer, reflux condenser, and internal thermometer, and the mixture was heated to 140° C. and stirred at this temperature for 2 h. As the reaction time increased here, a reduction occurred in the temperature of the reaction mixture, caused by the onset of evaporative cooling from the ethanol liberated. The reflux condenser was then replaced by an inclined condenser and, based on the equivalent amount of catalyst, one equivalent of phosphoric acid was added, ethanol was removed by distillation, and the temperature of the reaction mixture was slowly increased up to 160° C. The alcohol removed by distillation was collected in a cooled round-bottomed flask and weighed, and the conversion thus determined was 72%, compared with the full conversion theoretically possible.

Dry nitrogen was then passed at 160° C. through the reaction mixture for a period of 1 h, in order to remove any remaining amounts of monomers present. The reaction mixture was then cooled to room temperature.

Analysis of Polycarbonates of the Invention:
The polycarbonates were analyzed by gel permeation chromatography, using a refractometer as detector. Dimethylacetamide was used as mobile phase, and polymethyl methacrylate (PMMA) was used as standard for molar mass determination. $M_w$=2300 g/mol; $M_n$=1500 g/mol.

OH number was determined to DIN 53240, part 2, and was 400 mg KOH/g. The expression "TMP×1.2 PO" here describes a product which has been reacted with an average of 1.2 mol of propylene oxide (PO) per mole of trimethylolpropane (TMP).

Component D3

Poly-n-butyl acrylate oligomer with a molar mass of 1700 g/mol (determined at 25° C. as Mw by means of GPC, THF as eluent, polystyrene as standard).

Production of Compounded Materials

The components were mixed in a twin-screw extruder at a melt temperature of from 260 to 300° C. The melt was passed through a water bath and pelletized.

Production of Matrices

The components were mixed in a twin-screw extruder at a melt temperature of from 240 to 260° C. The melt was passed through a water bath and pelletized.

Constitution and properties of compounded materials:

TABLE 1

| Example | comp 1 | comp 2 | comp 3 | 4 | 5 | 6 | 7 |
|---|---|---|---|---|---|---|---|
| Component A1 | 80 | — | — | 78 | — | — | — |
| Component A2 | — | 80 | — | — | 78 | 78.5 | 78.5 |
| Component A comp 1 | — | — | 80 | — | — | — | — |
| Component B1 | 5 | 5 | 5 | 5 | 5 | 5 | — |
| Component B2 | — | — | — | — | — | — | 5 |
| Component D3 | — | — | — | 2 | 2 | — | — |
| Component D1 | — | — | — | — | — | 1.5 | 1.5 |
| Component C1 | 15 | 15 | 15 | 15 | 15 | 15 | 15 |
| Vicat B [° C.] | 113 | 112 | 112 | 112 | 111 | 112 | 112 |
| MVI [ml/10 min] | 7.8 | 10.8 | 14.3 | 11.3 | 14.1 | 13.6 | 13.4 |
| An, RT [kJ/m$^2$] | 17.2 | 15.1 | 11.9 | 19.1 | 17.6 | 18.1 | 19.2 |
| Modulus of elasticity [MPa] | 6870 | 6900 | 6950 | 7200 | 7100 | 7150 | 7100 |
| Tensile strain at break [%] | 1.8 | 1.7 | 1.4 | 1.9 | 1.8 | 1.9 | 1.9 |

The matrices were processed as described above, using component C2, to give fiber-composite materials with fiber volume of 0.52. Transverse-longitudinal shear strength ($R_\perp\|$) at 80° C. was determined in a flexural test to DIN 53398-2. Longitudinal compressive strength ($R_{LD}$) at 80° C. was determined in a flexural test to DIN 53398-1.

TABLE 2

| | comp 8 | comp 9 | 10 | 11 | 12 | 13 | comp 14 |
|---|---|---|---|---|---|---|---|
| Matrix | | | | | | | |
| A1 | 100 | 90 | 88 | — | — | — | — |
| A2 | — | — | — | 88 | 88 | 88 | — |
| A comp | — | — | — | — | — | — | 90 |
| B1 | — | 10 | 10 | 10 | — | 10 | — |
| B2 | — | — | — | — | 10 | — | 10 |
| D3 | — | — | 2 | 2 | 2 | — | — |
| D1 | — | — | — | — | — | 2 | — |
| Composite materials | | | | | | | |
| ($R\perp\|$) [MPa] | 30 | 43 | 51 | 48 | 49 | 47 | 27 |
| ($R_{LD}$) [MPa] | 410 | 530 | 570 | 560 | 565 | 560 | 315 |

The molding compositions or composite materials of the invention exhibit improved toughness and stiffness.

The invention claimed is:

1. A thermoplastic molding composition consisting of
   a) as component A, from 70 to 90% by weight of one or more (methyl)styrene-acrylonitrile copolymers which do not have any units derived from maleic anhydride, and which have an intrinsic viscosity smaller than 85 ml/g,
   b) as component B, from 3 to 10% by weight of one or more (methyl)styrene-acrylonitrile copolymers which have, based on the entire component B, from 0.5 to 5% by weight of units derived from maleic anhydride,
   c) as component C, from 10 to 20% by weight of glass fibers,
   d) from 1 to 3% by weight of one or more flow promoters,
      $d_1$) as component D1, at least one highly branched or hyperbranched polycarbonate with an OH number of from 1 to 600 mg KOH/g of polycarbonate (according to DIN 53240, part 2), and optionally
   e) as component E, of further fillers, or rubbers, and/or further additives,
where the total amount of components A to D1 and, if present, E does not exceed 100% by weight.

2. The molding composition according to claim 1, wherein component B has from 1.0 to 2.5% by weight of units derived from maleic anhydride.

3. The molding composition according to claim 1, wherein component D1 has a number-average molar mass Mn of from 100 to 15 000 g/mol.

4. The molding composition according to claim 1, wherein component D1 has a glass transition temperature Tg of from −80° C. to 140° C.

5. The molding composition according to claim 1, wherein component D1 has a viscosity (mPas) of from 50 to 200 000 at 23° C. (to DIN 53019).

6. A process for the production of thermoplastic molding compositions according to claim 1, which comprises mixing components A to D1 in any sequence with one another.

7. A molding, fiber or foil composed of the thermoplastic molding composition according to claim 1.

8. A thermoplastic molding composition consisting of
   a) as component A, from 70 to 90% by weight of one or more (methyl)styrene-acrylonitrile copolymers which do not have any units derived from maleic anhydride, and which have an intrinsic viscosity smaller than 85 ml/g,
   b) as component B, from 3 to 10% by weight of one or more (methyl)styene-acrylonitrile copolymers which have, based on the entire component B, from 0.5 to 5% by weight of units derived from maleic anhydride,
   c) as component C, from 10 to 20% by weight of glass fibers, and
   d) from 1 to 3% by weight of one or more flow promoters,
      d1) as component D1, at least one highly branched or hyperbranched polycarbonate with an OH number from 1 to 600 mg KOH/g of polycarbonate (according to DIN 54240, part 2).

* * * * *